United States Patent
Liu (10) Patent No.: US 12,282,299 B2
(45) Date of Patent: Apr. 22, 2025

(54) ALARM CLOCK

(71) Applicant: AdvanOrigin Co., Ltd., Hsinchu (TW)

(72) Inventor: Te-Hua Liu, Hsinchu (TW)

(73) Assignee: AdvanOrigin Co., Ltd., Hsinchu (TW)

( * ) Notice: Subject to any disclaimer, the term of this patent is extended or adjusted under 35 U.S.C. 154(b) by 575 days.

(21) Appl. No.: 17/826,065

(22) Filed: May 26, 2022

(65) Prior Publication Data
US 2022/0413445 A1    Dec. 29, 2022

(30) Foreign Application Priority Data

Jun. 29, 2021 (TW) ................................. 110123724

(51) Int. Cl.
| | | |
|---|---|---|
| G04G 13/02 | (2006.01) | |
| G04G 9/10 | (2006.01) | |
| G06F 3/02 | (2006.01) | |
| G09G 3/14 | (2006.01) | |
| G09G 3/34 | (2006.01) | |
| G09G 3/36 | (2006.01) | |

(52) U.S. Cl.
CPC ............. *G04G 13/026* (2013.01); *G04G 9/10* (2013.01); *G04G 13/02* (2013.01); *G04G 13/021* (2013.01); *G06F 3/02* (2013.01); *G09G 3/14* (2013.01); *G09G 3/3406* (2013.01); *G09G 3/36* (2013.01); *G09G 2354/00* (2013.01)

(58) Field of Classification Search
CPC .... G04G 13/02; G04G 13/021; G04G 13/026; G04G 9/10
See application file for complete search history.

(56) References Cited

U.S. PATENT DOCUMENTS

| | | | | |
|---|---|---|---|---|
| 4,301,524 A | * | 11/1981 | Koepp | G04G 13/026 368/251 |
| 4,868,800 A | * | 9/1989 | Arber | G04G 11/00 368/41 |
| 8,289,817 B1 | * | 10/2012 | Bath | G04G 13/021 368/243 |
| 8,498,181 B1 | * | 7/2013 | Bath | G06F 3/04886 368/243 |
| 2013/0154981 A1 | * | 6/2013 | Park | H04M 1/72466 345/173 |
| 2013/0208575 A1 | * | 8/2013 | Sammut | G04G 13/021 368/250 |
| 2014/0304664 A1 | * | 10/2014 | Lee | G06F 3/0488 715/863 |

* cited by examiner

*Primary Examiner* — Edwin A. Leon
*Assistant Examiner* — Sean R Brannon
(74) *Attorney, Agent, or Firm* — HSML P.C.

(57) ABSTRACT

An alarm clock includes a microcontroller, a display unit, an audio output unit, ten numeric keys and a functional key. Upon determining that a long-press operation is performed on one of the numeric keys that corresponds to a weekly alarm setting, the microcontroller performs a weekly alarm setting procedure for the corresponding weekly alarm setting. In the weekly alarm setting procedure, the microcontroller sets an alarm time based on some numeric keys that are pressed in a time-setting stage, and sets an alarm day based on at least one numeric key and the functional key that are pressed in a day-setting stage. Then, the microcontroller displays the alarm time and the alarm day on the display unit.

16 Claims, 3 Drawing Sheets

ALARM CLOCK

CROSS-REFERENCE TO RELATED APPLICATION

This application claims priority of Taiwanese: Invention Patent Application No. 110123724, filed Jun. 20, 2021.

FIELD

The disclosure relates to an alarm clock, more particularly to an alarm dock that has multiple alarm settings while maintaining a simple design, a low material cost and a small size, and that has a straightforward user interface for intuitive operation and is thus easy to set alarms.

BACKGROUND

Traditional alarm clocks usually require users to manually enable an alarm function before bedtime, and, during the setting of the time, require the users to press a single button many times to increase counts for hours or minutes to complete the setting of the time, which is inconvenient and time-consuming. In addition, when a traditional alarm clock with a snooze function is ringing, a user usually needs to stop the ringing by toggling a switch, which also takes more time for the user to operate, making the ringing time longer and affecting other people around. Nowadays, smartphones also have an alarm clock function, but often have the disadvantage of consuming more power than traditional alarm clocks. In addition, smartphones usually do not have physical buttons and cost much more than traditional alarm clocks, and are more prone to damage.

SUMMARY

Therefore, an object of the disclosure is to provide an alarm clock that can alleviate at least one of the drawbacks of the prior art.

According to the disclosure, the alarm clock stores at least one alarm setting, and includes a display unit, an audio output unit, ten numeric keys that respectively correspond to ten different integers, a functional key, and a microcontroller that is electrically connected to the display unit, the audio output unit, the numeric keys and the functional key. The at least one alarm setting includes at least weekly alarm setting, and each of the at least one alarm setting corresponds to one of the numeric keys. The microcontroller is configured to measure a clock date and a clock time, and to, upon determining that a long-press operation is performed on one of the numeric keys that corresponds to one of the at least one weekly alarm setting, perform a weekly alarm setting procedure with respect to the one of the at least one weekly alarm setting, the weekly alarm setting procedure including a time-setting stage and a day-setting stage. The microcontroller is configured to, in the time-setting stage, set an alarm time for the one of the at least one weekly alarm setting based on same of the numeric keys that are pressed in the setting stage. Seven in the ten numeric keys respectively correspond to the seven days of the week in the day-setting stage, and the microcontroller is configured to, when one of the seven in the ten numeric keys is pressed and then the functional key is pressed in the day-setting stage, set, for the one of the at least one weekly alarm setting, a day of the week that corresponds to the one of the seven in the ten numeric keys to be an alarm day on which the microcontroller controls the audio output unit to output an alarm signal at the alarm time. The microcontroller is configured to display the alarm time and the alarm day on the display unit.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal porticos of reference numerals have been repeated among the figures to indicate corresponding or analogous elements, which may optionally have similar characteristics.

Figure 1:
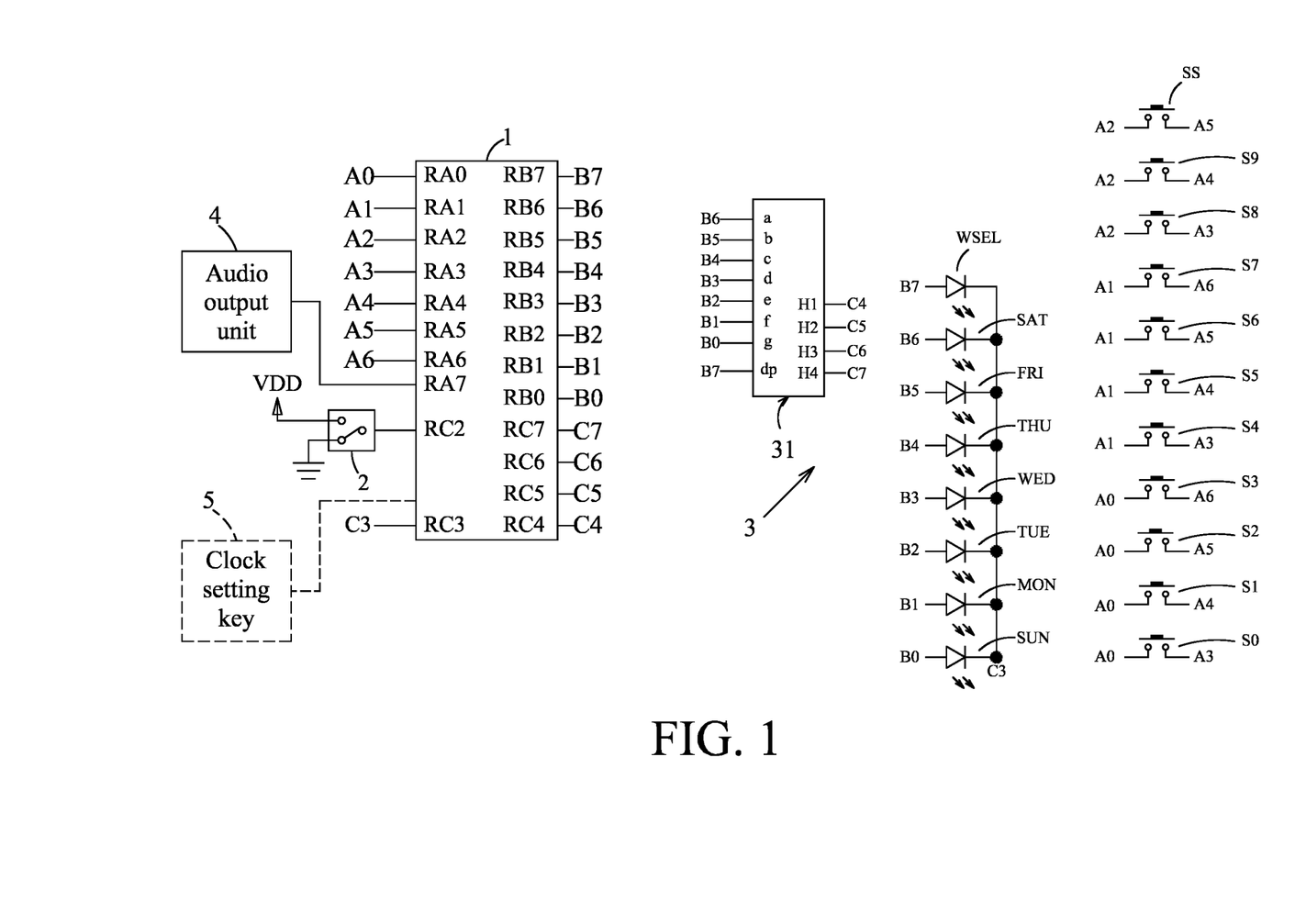
FIG. 1 is a schematic circuit diagram illustrating a first embodiment of an alarm clock according to the disclosure.

Referring to FIG. 1, a first embodiment of an alarm clock according to this disclosure is shown to include a microcontroller 1, and a switch 2, a display unit 3, an audio output unit 4, ten numeric keys S0-S9 and a functional key SS that are electrically connected to the microcontroller 1. In this embodiment, the microcontroller 1 is exemplified using an integrated circuit (IC) chip "PIC16F18855", which is developed by Microchip Technology Inc., and which includes input/output (I/O) pins RA0-RA7, RB0-RB7 and RC2-RC7.

The display unit 3 includes a seven-segment assembly 31, a zeroth light emitting diode (LED) "SUN" for indicating Sunday, a first LED "MON" for indicating Monday, a second LED "TUE" for indicating Tuesday, a third LED "WED" for indicating Wednesday, a fourth LED "THU" for indicating Thursday, a fifth LED "FRI" for indicating Friday, a sixth LED "SAT" for indicating Saturday, and a seventh LED "WSEL" fox indicating that a current display is related to an alarm setting. Further referring to FIG. 2, the seven-segment assembly 31 includes four seven-segment displays 311-314 each having seven light-emitting segments for representation of a digit or a character, and a colon display 315. The seven-segment displays 311-314 can be used to respectively show four digits for representation of hour/minute or date, and the colon display 315 may include an LED for displaying a symbol of a colon. The seven-segment assembly 31 has pins H1-H4 that are electrically and respectively connected to the seven-segment displays 311-314, and that are electrically and respectively connected to the pins RC4-RC7 of the microcontroller 1 for the microcontroller 1 to control each of the seven-segment displays 311-314 to display or not display through the corresponding one of the pins H1-H4. The seven-segment assembly 31 further has pins a-g that are electrically and respectively connected to the seven light-emitting segments of each of the seven-segment displays 311-314, namely, the pins a-g are common to the seven-segment displays 311-314. The pins a-g are further electrically and respectively connected to the pin RB6, the pin RB5, the pin RB4, the pin RB3, the pin RB2, the pin RB1, and the pin RB0 of the microcontroller 1 for the microcontroller 1 to control light emission of the light-emitting segments of the seven-segment displays 311-314 through the pins RB0 to RB6. In this embodiment, for each of the seven-segment displays 311-314, the seven light-emitting segments thereof respectively correspond to seven LEDs, the corresponding one of the pins H1-H4 is a common cathode of the seven LEDs, and the pins a-g are respectively connected to the anodes of the seven LEDs, but this disclosure is not limited in this respect. The seven-segment assembly 31 further has a pin dp that is electrically connected to the colon display 315 and the pin RB7 of the microcontroller 1 for the microcontroller 1 to control light emission of the color display 315. Since the pins a-g are common to the seven-segment displays 311-314, signals sent by the microcontroller 1 through the pins RB0-RB6 would be provided to all of the seven-segment displays 311-314, and the microcontroller 1 controls the seven-segment displays 311-314, one by one, to display digits through the pins H1-H4 (e.g., having one pin at logic "0", and the other three pins at logic "1") in such a way that users can simultaneously perceive four digits respectively on the seven-segment displays 311-314 by persistence of vision.

Figure 2:
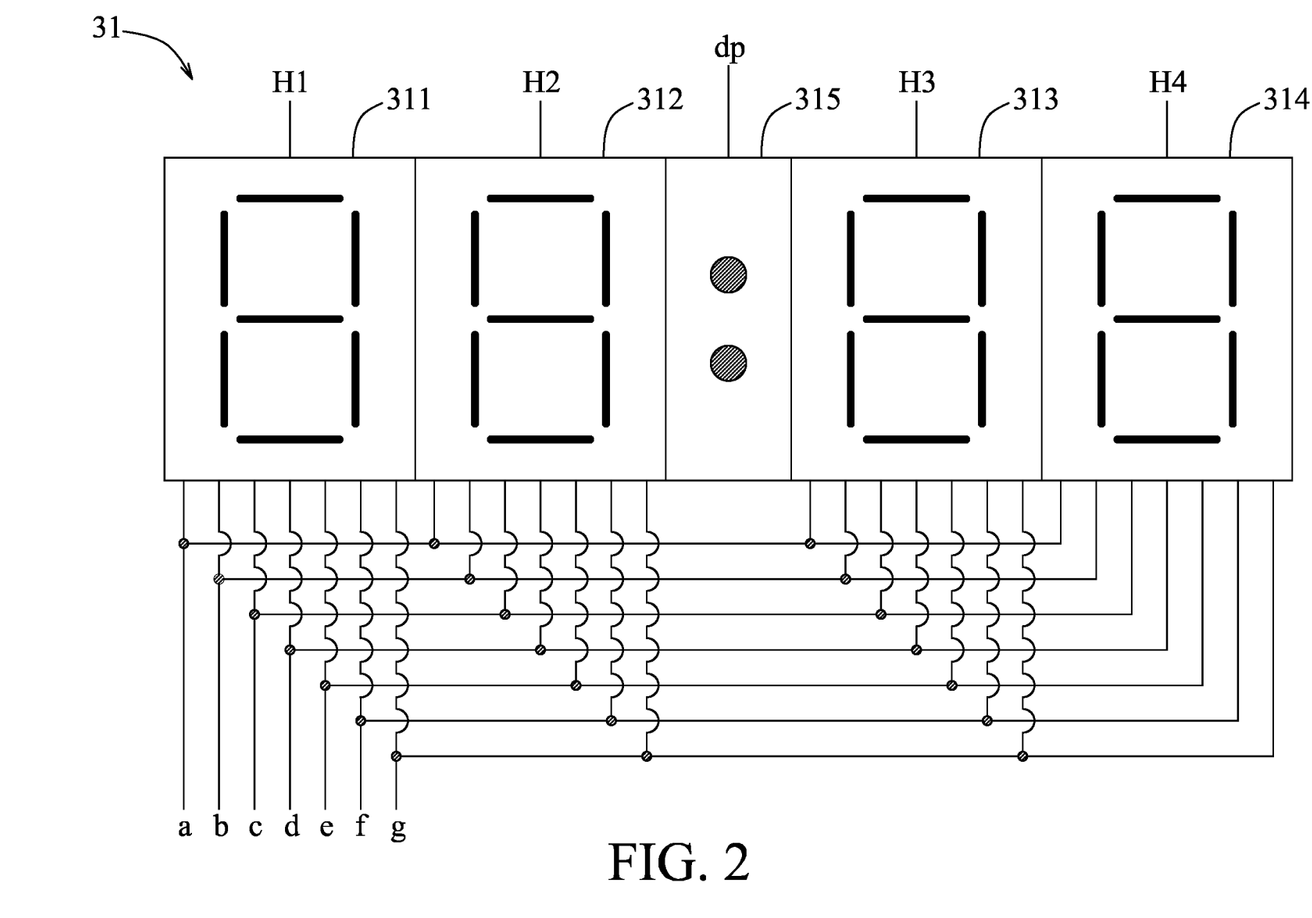
FIG. 2 is a schematic circuit diagram illustrating a seven-segment assembly of the first embodiment.

Each of the zeroth to seventh LEDs includes an anode and a cathode. In this embodiment, the cathodes of the zeroth to seventh LEDs are all electrically connected to the pin RC3 of the microcontroller 1, and the anode of each of the zeroth to seventh LEDs is electrically connected to a unique one of the pins RB0-RB7 of the microcontroller 1 (first LED connection scenario). In some embodiments, the anodes of the zeroth to seventh LEDs can all be electrically connected to the pin RC3 of the microcontroller 1, and the cathode of each of the zeroth to seventh LEDs is electrically connected to a unique one of the pins RB0-RB7 of the microcontroller 1 (second LED connection scenario). In other words, the zeroth to seventh LEDs and the seven-segment displays 311-314 share pins RB0-RB7, so the microcontroller 1 can selectively control light emission of the zeroth to seventh LEDs or the seven-segment displays 311-314 through the pine RB0-RB7. In one example, when the pin RC3 is given logic "0" and RC4-RC7 are each given logic "1", the signals sent through the pins RB0-RB7 are used for controlling light emission of the zeroth to seventh LEDs. In one example, when the pin RC3 is given logic "1", one of the pins RC4-RC7 is given logic "0", and the other three of the pins RC4-RC7 are each given logic "1", the signals sent through the pins RB0-RB7 are used tor controlling light emission of one of the seven-segment displays 311-314. Similarly, the microcontroller 1 controls the zeroth to seventh LEDs and the seven-segment displays 311-314 to display one after another in such a way that users can simultaneously perceive four digits respectively on the seven-segment displays 311-314 and/or the light emitted by the zeroth to seventh LEDs by persistence of vision.

The switch 2 includes a first terminal electrically connected to a voltage source VDD, a second terminal electrically connected to ground, and a third terminal electrically connected to the pin RC2 of the microcontroller 1, and is operable to electrically connect the third terminal to one of the first, terminal and the second terminal. In this embodiment, the alarm clock stores at least one alarm setting (e.g., in an SRAM unit of the microcontroller 1), the microcontroller 1 is configured to measure a clock date and a clock time, and the switch 2 is operable to enable or disable all of the at least one alarm setting. The switch 2 is defined to be in an ON state where the microcontroller 1 enables all of the at least one alarm setting when the third terminal is electrically connected to a specific one of the first and second terminals, and is defined to be in an OFF state where the microcontroller 1 disables all of the at least one alarm setting when the third terminal is electrically connected to the other one of the first and second terminals. In this embodiment, the switch 2 is defined to be in the OFF state when the second terminal of the switch 2 is electrically connected to the pin RC2 through the third terminal and the pin RC2 is thus grounded, and is defined to be in the ON state when the first terminal of the switch 2 is electrically connected to the pin RC2 through the third terminal, end the pin RC2 is thus at a voltage level of the voltage source VDD. In some embodiments, the state of the switch 2 may be defined in a different manner by changing a code to be executed by the microcontroller 1. For example, the code may be modified such that the switch 2 is defined to be in the ON state when the second terminal of the switch 2 is electrically connected to the pin RC2 through the third terminal and the pin RC2 is thus grounded, and is defined to be in the OFF state when the first terminal of the switch 2 is electrically connected to the pin RC2 through the third terminal, and the pin RC2 is thus at the voltage level of the voltage source VDD.

In this embodiment, the audio output unit 4 may be realized as, for example, a buzzer or a speaker, and is electrically connected to the pin RA7 of the microcontroller 1. It is noted that FIG. 1 illustrates the audio output unit 4 using a block, and its circuit components are omitted for the sake of clarity.

The ten numeric keys S0-S9 include a number-zero key S0, a number-one key S1, a number-two key S2, a number-three key S3, a number-four key S4, a number-five key S5, a number-six key S6, a number-seven key S7, a number-eight key S8 and a number-nine key S9 that respectively correspond to integers from zero to nine. Each of the numeric keys S0-S9 and the functional key SS is electrically connected to a unique combination of two of the pins RA0-RA6, has a first terminal, a second terminal and a press terminal, and is configured to make electrical connection between the first and second terminals thereof when the press terminal thereof is being pressed by a user, and to break electrical connection between the first and second terminals thereof when the press terminal thereof is not being pressed. The first and second terminals of each of the numeric keys S0-S9 and the functional key SS are respectively connected to said two of the pins RA0-RA6 in the unique combination. In this embodiment, the first and second terminals of the number-zero key S0 are electrically and respectively connected to pins RA0, RA3, the first and second terminals of the number-one key S1 are electrically and respectively connected to pins RA0, RA4, the first and second terminals of the number-two key S2 are electrically and respectively connected to pins RA0, RA5, the first and second terminals of the number-three key S3 are electrically and respectively connected to pins RA0, RA6, the first and second terminals of the number-four key S4 were electrically and respectively connected to pins RA1, RA3, the first and second terminals of the number-five key S5 are electrically and respectively connected to pins RA1, RA4, the first and second terminals of the number-six key S6 are electrically and respectively connected to pins RA1, RA5, the first and second terminals of the number-seven key S7 are electrically and respectively connected to pins RA1, RA6, the first and second terminals of the number-eight key S8 are electrically and respectively connected to pins RA2, RA3, the first and second terminals of the number-nine key S9 are electrically and respectively connected to pins RA2, RA4, and the first and second terminals of the functional key SS are electrically and respectively connected to pins RA2, RA5. Table 1 shows the abovementioned connections among the keys S0-S9, SS and the pins RA0-RA6, which means that, as an example, when the numeric key S0 is being pressed, pins RA0 and RA3 are electrically connected together.

TABLE 1

|  | pin RA3 | pin RA4 | pin RA5 | pin RA6 |
|---|---|---|---|---|
| pin RA0 | S0 | S1 | S2 | S3 |
| pin RA1 | S4 | S5 | S6 | S7 |
| pin RA2 | S8 | S9 | SS | |

As a result, the ten numeric keys S0-S9 and the functional key SS use only seven pins RA0-RA6 in total in this embodiment, and the microcontroller 1 determines which one of the numeric keys S0-S9 and the functional key SS is being pressed by detecting which two of the pins RA0-RA6 are electrically connected to each other, thereby reducing a required number of pins of the microcontroller 1. In other embodiments where the microcontroller 1 has a sufficient number of pins, the microcontroller 1 may use eleven I/O pins to make electric connections to the numeric keys S0-S9 and the functional key SS, so as to detect which one of the numeric keys S0-S9 and the functional key SS is being pressed. Table 1 only shows one possible approach for the connections between the keys S0-S9, SS and the microcontroller 1, and this disclosure is not limited in this respect.

In this embodiment, the microcontroller 1 is exemplified to store five alarm settings A01, B01, C01, D01 and E01 (altogether denoted using A01-E01) that respectively correspond to a pair of the numeric keys S0, S1, a pair of the numeric keys S2, S3, a pair of the numeric keys S4, S5, a pair of the numeric keys S6, S7, and a pair of the numeric keys S8, S9. In other words, the numeric keys S0-S9 are divided into five alarm-setting key pairs, each corresponding to a respective one of the alarm settings and including two of the numeric keys S0-S9 that respectively serve as a first alarm-setting key (e.g., the numeric key S0, S2, S4, S6, S8 in the respective alarm-setting key pair) and a second alarm-setting key (e.g., the numeric key S1, S3, S5, S7, S9 in the respective alarm-setting key pair). In this embodiment, each of the five alarm settings is a weekly alarm setting, but this disclosure is not limited in this respect. When the microcontroller 1 determines that a long-press operation is performed on one of the numeric keys S0-S9 (e.g., kept being pressed for a predetermined length of time, such as two seconds), the microcontroller 1 performs a weekly alarm setting procedure for one of the weekly alarm settings A01-B01 that corresponds to the pressed numeric key, where the weekly alarm setting procedure includes a time-setting stage and a day-setting stage.

In the time-setting stage, the microcontroller 1 sets an alarm time for the weekly alarm setting based on some of the numeric keys that are pressed in the time-setting stage (or to be specific, four pressings performed on the numeric keys).

In the day-setting stage, seven in the ten numeric key S0-S9 (e.g., the numeric keys S0-S6 or S1-S7) serve as day-setting keys that respectively correspond to seven days of the week, and, when one of the day-setting keys is pressed and then the functional key SS is pressed in the day-setting stage, the microcontroller 1 sets, for the weekly alarm setting, a day of the week that corresponds to the pressed day-setting key to be an alarm day on which the microcontroller 1 is to control the audio output unit 4 to output an alarm signal (e.g., an alarm sound) at the alarm time set for the weekly alarm setting. It is noted that more than one alarm day may be set for a single weekly alarm setting by pressing more than one day-setting key before pressing the functional key SS.

After the weekly alarm setting procedure, the microcontroller 1 may display the alarm time and the alarm day on the display unit 3.

For example, upon determining that the long-press operation is performed on the numeric key S0 (the first alarm-setting key in the alarm-setting key pair of the numeric keys S0, S1), the microcontroller 1 performs the weekly alarm setting procedure with respect to the alarm setting A01 and enters the day-setting stage, where the microcontroller 1 determines what day-setting key(s) was (were) pressed in the day-setting stage to set the alarm day(s) upon determining that the functional key SS is pressed. In other words, the user may perform the long-press operation on the numeric key S0 to set the alarm day(s) for the alarm setting A01, and press, for example, the numeric keys S1 to S5 to select Monday to Friday to be candidates of the alarm days for the alarm setting A01. At this time, the microcontroller 1 may control the first to fifth LEDs to emit light simultaneously, so as to display, for example, symbols of "MON", "TUE", "WED", "THU" and "FRI" on the display unit 3, and control the seventh LED to emit light to indicate that the current display is related to an alarm setting. It is noted that, in the day-setting stage, the user may deselect a selected day by pressing the corresponding numeric key again. For example, when "Monday" has been selected in the day-setting stage, the user may press the numeric key S1 to deselect Monday. Then, the user may press the functional key SS to complete the setting of the alarm days with respect to the alarm setting A01 (Monday to Friday are then set to be the alarm days). In the day-setting stage, the microcontroller 1 may further control the zeroth to sixth LEDs to display the setting of the alarm day(s), and control the seventh LED to emit light to indicate that the current display is related to an alarm setting. To be specific, when one or more of the days of the week are selected, the microcontroller 1 controls the zeroth to sixth LEDs to display the alarm day(s) for the alarm setting, and controls the seventh LED to emit light; and when none of the days of the week is selected, the microcontroller 1 controls the seventh LED "WSEL" to emit light, and controls the zeroth to sixth LEDs to not emit light, so users will not be confused when none of the zeroth to sixth LEDs that respectively correspond to the seven days of the week emits light.

Upon determining that the long-press operation is performed on the numeric key S1 (the second alarm-setting key in the alarm-setting key pair of the numeric keys S0, S1), the microcontroller 1 enters the time-setting stage of the weekly alarm setting procedure with respect to the alarm setting A01, where the microcontroller 1 determines what numeric keys are pressed to set the alarm time, and controls the seven-segment displays 311-314 to display the alarm time. For example, when the numeric keys S0, S6, S3 and S0 are pressed in sequence, the microcontroller 1 may set the alarm time at 06:30 AM for the alarm setting A01. The time-setting stage may include an hour-setting step and a minute-setting step, each requiring two digits to be set. In the time-setting stage, the microcontroller 1 may control the seven-segment displays 311-314 to flash two digits of the hour or the minute that is currently under input operation. Upon determining that the functional key SS is pressed in each of the hour-setting step and the minute-setting step, the microcontroller 1 may directly enter the next step. For example, when the setting of the hour need not be changed, the user may press the functional key SS to skip the hour-setting step and to enter the minute-setting step; or, when the setting of the minute need not be changed, the user may press the functional key S3 to skip the minute-setting step and to end the time-setting stage. In some embodiments, the microcontroller 1 may be configured to enter the time-setting stage after completion of the day-setting stage. For example, the microcontroller 1 may enter the time-setting stage of the weekly alarm setting procedure with respect to the alarm setting A01 upon determining that the functional key SS has been pressed in the day-setting stage of the weekly alarm setting procedure with respect to the alarm setting A01.

The operation for setting each of the alarm settings B01-E01 is similar to the abovementioned operation for setting the alarm setting A01, so details thereof are omitted herein for the sake of brevity.

Briefly, in this embodiment, the user may set the alarm day(s) for one of the alarm settings A01-E01 by long-pressing the corresponding one of the numeric keys S0, S2, S4, S6 and S8, and set the alarm time for one of the alarm settings A01-E01 by long-pressing the corresponding on of the numeric keys S1, S3, S5, S7 and S9.

In some embodiments, the microcontroller 1 may automatically enter the time-setting stage after the functional key S3 is pressed in the day-setting stage, and the long-press operation on the second alarm-setting key is not required. For example, the user may long-press the numeric key S0 to set the alarm day(s) for the alarm setting A01, and setting of the alarm time for the alarm setting A01 may automatically begin after the functional key SS is pressed to complete the setting of the alarm day(s), without the need to long-press the numeric key S1.

In some embodiments, when the microcontroller 1 determines that the functional key SS and one of the numeric keys S0-S9 are both pressed (i.e., both being in a pressed state at a time point), the microcontroller 1 performs a starting date setting procedure for one of the weekly alarm settings A01-E01 that corresponds to one of the alarm-setting key pairs which includes the pressed one of the numeric keys S0-S9, and displays information of said one of the weekly alarm settings A01-E01 on the display unit 3. For example, when the microcontroller 1 determines that the functional key SS and the numeric key S0 (or S1) are pressed at the same time, the microcontroller 1 performs the starting date setting procedure for the weekly alarm setting A01, where the microcontroller 1 sets a starting data from which the weekly alarm setting A01 is to be enabled based on some (e.g., four numeric keys, two of which represent a month and the other two of which represent a day of the month) of the numeric keys S0-S9 that are pressed in the starting date setting procedure, and controls the seven-segment displays 311-314 to display the starting date.

The operation for setting the starting date for each of the alarm settings is similar to the abovementioned operation for setting the starting date for the alarm setting A01, so details thereof are omitted herein for the sake of brevity.

In this embodiment, the alarm clock can at most have five alarm settings because a single alarm setting corresponds to two numeric keys, one for entering the day-setting stage and one for entering the time-setting stage.

In some embodiments where the microcontroller 1 automatically enters the time-setting stage after the functional key SS is pressed in the day-setting stage, the alarm clock may have ten alarm settings that respectively correspond to the ten numeric keys S0-S9. In some implementations, the ten alarm settings may include nine weekly alarm settings A02, B02, C02, D02, E02, F02, G02, H02, I02 (hereinafter collectively denoted by A02-I02) that respectively correspond to, for example, the numeric keys S0-S8, and a date alarm setting J02 that corresponds to the numeric key S9. Details for setting each of the weekly alarm setting A02-I02 (including the weekly alarm setting procedure and the starting date setting procedure) may be similar to those introduced for the weekly alarm settings A01-E01 hereinbefore, and are thus omitted herein for the sake of brevity.

When the microcontroller 1 determines that the long-press operation is performed on the numeric key S9, the microcontroller 1 performs a date alarm setting procedure for the date alarm setting J02. The date alarm setting procedure includes a date-setting stage for setting an alarm date, and a time-setting stage for setting an alarm time. In this embodiment, when performing the date alarm setting procedure, the microcontroller 1 enters the date-setting stage first, where the microcontroller 1 sets, based on some of the numeric keys S0-S9 that are pressed in the date-setting stage, the alarm date on which the microcontroller 1 is to control the audio output unit 4 to output the alarm signal at the alarm time set for the date alarm setting J02. The date-setting stage may include a month-setting step and a day-setting step, each requiring two digits to be set. Upon determining that the functional key SS is pressed in each of the month-setting step and the day-setting step, the microcontroller 1 may directly enter the next step. For example, when the setting of the month need not be changed, the user may press the functional key SS to slip the month-setting step and to enter the day-setting step; or, when the setting of the day need not be changed, the user may press the functional key SS to skip the day-setting step and to end the date-setting stage. After completion of setting the alarm date in the date-setting stage (e.g., after four digits are entered in the date-setting stage, or the functional key SS is pressed in the date-setting stage), the microcontroller 1 may automatically enter the time-setting stage, where the microcontroller 1 sets the alarm time for the date alarm setting J02 based on some of the numeric keys S0-S9 that are pressed in the time-setting stage.

The microcontroller 1 may be further configured to, upon determining that a setting entry condition is satisfied, enter a clock setting stage where the microcontroller 1 sets the clock date and the clock time based on some of the numeric keys S0-S9 that are pressed in the clock setting stage, and display the clock date and the clock time on the display unit 3. In some embodiments, the setting entry condition is that predetermined two of the numeric keys S0-S9 are both pressed. As an example, the predetermined keys may be the numeric keys S8 and S9, and when the numeric keys S8, S9 are pressed at the same time, the microcontroller 1 enters the clock getting stage to set the clock date and the clock time. In some embodiments, the alarm clock further includes a clock setting key 5 that is electrically connected to the microcontroller 1, and the setting entry condition is that the clock setting key 5 is pressed. That is, upon determining that the clock setting key 5 is pressed, the microcontroller 1 enters the clock setting stage to set the clock date and the clock time.

In some embodiments, when the microcontroller 1 determines that none of the numeric keys S0-S9 and the functional key SS has been pressed for a predetermined displaying time period during which time the microcontroller 1 controls the display unit 3 to display the clock time and the clock date, the microcontroller 1 controls the seven-segment assembly 31 to not display until an arbitrary one of the functional key SS and the numeric keys S0-S9 is pressed, and, upon determining that one of the functional key SS and the numeric keys S0-S9 is pressed while the seven-segment assembly 31 is not displaying, the microcontroller 1 controls the seven-segment assembly 31 to display the clock date or the clock time for the predetermined displaying time period. The predetermined displaying time period may be, for example, four seconds long, where the clock time is displayed for the first three seconds, and then the clock date is displayed for one second. In some embodiments, after the setting of the clock date and the clock time, the microcontroller 1 displays the clock time and the clock date on the display unit 3 for the predetermined displaying time period.

In some embodiments, the microcontroller 1 is further configured to, upon determining that a short-press operation (e.g., being pressed for less than the predetermined length of time, such as two seconds) is performed on one of the numeric keys S0-S9 that corresponds to one of the alarm settings while the seven-segment assembly 31 is displaying the clock date or the clock time, control the seven-segment assembly 31 to display the alarm time that was set for the corresponding alarm setting, control the zeroth to sixth LEDs to display the alarm day(s) that was(were) set for the corresponding alarm setting, and control the seventh LED to emit light to indicate that the current display is related to an alarm setting. In some embodiments, upon determining that the functional key SS is pressed while the seven-segment assembly 31 is displaying the clock data or the clock time, the microcontroller 1 may control the display unit 3 to display a next alarm moment, which refers to the alarm time and the alarm day (and/or the alarm date) that were set for one of the alarm settings and that are next to (i.e., later than and closest to) the clock time and the clock date among all of the alarm settings. When controlling the display unit 3 to display the next alarm moment in a case that none of the days of the week is set for each of the alarm settings, the microcontroller 1 may control the seven-segment assembly 31 to display, for example, "--:--", and control the zeroth to seventh LEDs to not emit light.

When the microcontroller 1 determines that the clock date is equal to or later than the starting date set for one of the alarm settings and that the clock time is equal to the alarm time set for said one of the alarm settings, the microcontroller 1 controls the audio output unit 4 to output the alarm signal. Upon determining that the switch 2 is switched to the OFF state when the audio output unit 4 is outputting the alarm signal, the microcontroller 1 controls the audio output unit 4 to stop outputting the alarm signal. In this embodiment, the microcontroller 1 is further configured to, upon determining that one of the numeric keys S0-S9 is pressed when the audio output unit 4 is outputting the alarm signal, control the audio output unit 4 to stop outputting the alarm signal. As a result, the user can stop the output of the alarm signal in eleven ways (i.e., switching the switch 2 to the OFF state or pressing any one of the numeric keys S0-S9). In some embodiments, the microcontroller 1 is further configured to, upon determining that the functional key SS is pressed when the audio output unit 4 is outputting the alarm signal, control the audio output unit 4 to temporarily stop outputting the alarm signal for a predetermined snooze time period (e.g., five minutes), and then resume to output the alarm signal. In other words, when the functional key SS is pressed while the audio output unit 4 is outputting the alarm signal, the alarm clock enters a snooze mode. Further, when the switch 2 is switched to the OFF state during the predetermined snooze time period, the microcontroller 1 may end or disable the snooze mode (i.e., the audio output unit 4 will not output the alarm signal when the predetermined snooze time period ends), and disables all of the alarm settings until the switch 2 is switched to the ON state again.

In some embodiments, the microcontroller 1 is configured to, upon determining that the functional key SS is pressed when the switch 2 is in the OFF state and the seven-segment assembly 31 is displaying the clock date or the clock time, display a message indicating that none of the alarm settings is enabled (e.g., controlling the seven-segment assembly 31 to display "OFF"). In some embodiments, the microcontroller 1 is configured to, when the switch 2 is switched from the OFF state to the ON state, control the display unit 3 to display the next alarm moment.

In this embodiment, the alarm clock stores program codes that, when executed by the microcontroller 1, cause the microcontroller 1 to perform the operations as introduced previously. In other embodiments, the microcontroller 1 may be of other brands or other models, as long as the quantities of I/O pins required by this embodiment can be provided. It is noted that "RA0 to RA7", "RB0 to RB7" and "RC2 to RC7" used in this embodiment are simply pin names, and are not used to limit this disclosure to the specific connections with respect to those pins. Taking the connections of the zeroth to seventh LEDs as an example, the zeroth to seventh LEDs and the microcontroller 1 may be connected to the pins RB0 to RB7 in different combinations in one embodiment, the connections between the zeroth to seventh LEDs and the microcontroller 1 may be realized using different I/O pins (e.g., the pins RA0 to RA7) in one embodiment, and the zeroth to seventh LEDs may be connected to another model of the microcontroller 1 that has pins with different pin names in one embodiment, and this disclosure is not limited in this respect.

Figure 3:
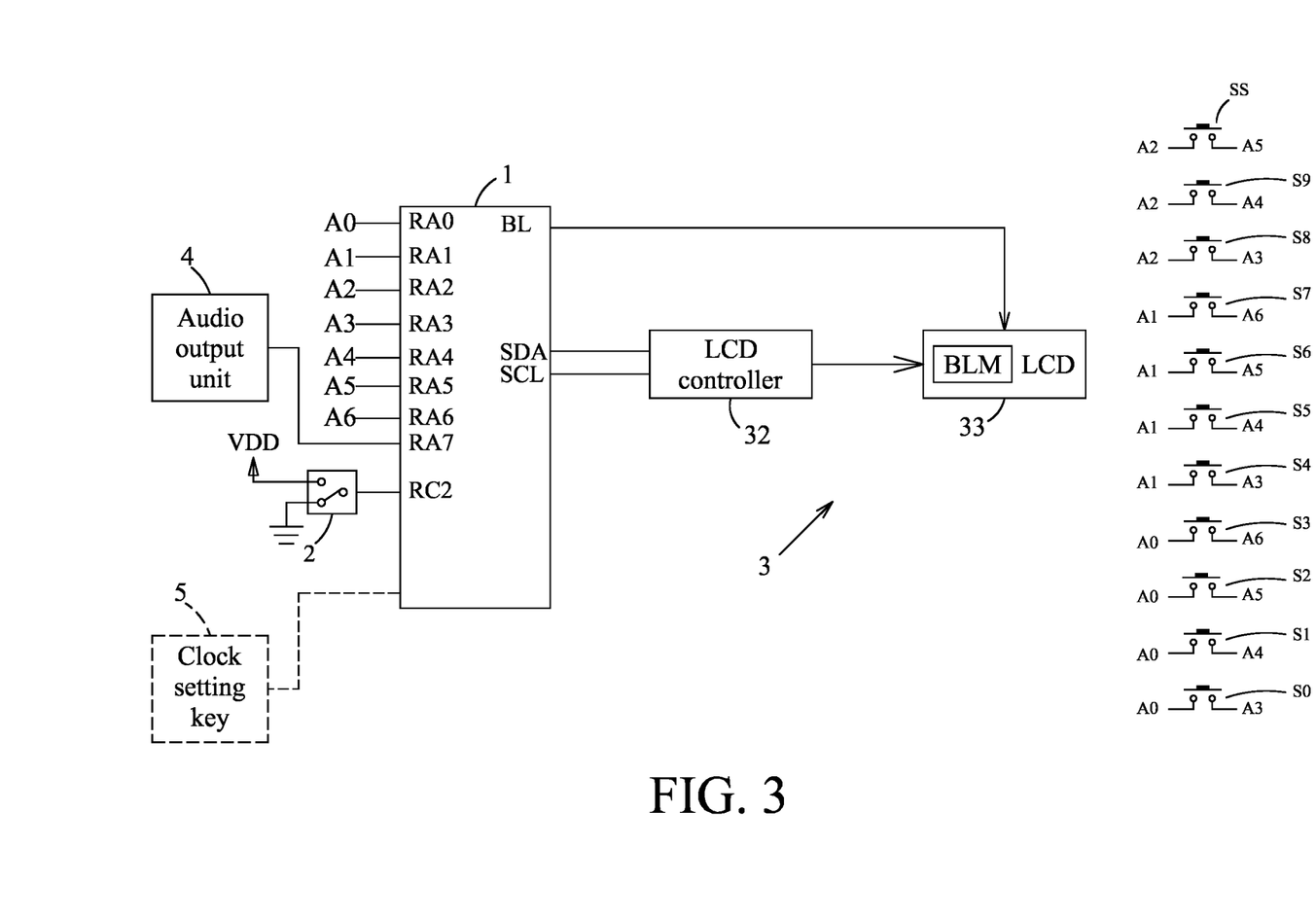
FIG. 3 is a schematic circuit diagram illustrating a second embodiment of an alarm clock according to the disclosure.

Referring to FIG. 3, a second embodiment of an alarm clock according to this disclosure is similar to the first embodiment, and differs from the first embodiment in that the display unit 3 includes a liquid crystal display (LCD) controller 32 and an LCD 33 (e.g., having a small-sized liquid crystal screen) to replace the zeroth to seventh LEDs and the seven-segment assembly 31 in the first embodiment, so the pins RC3 to RC7 and RB0 to RB7 in the first embodiment (see FIG. 1) can be omitted, and the microcontroller 1 of the second embodiment includes a set of data transmission pins (e.g., an SDA pin and an SCL pin of an I$^2$C interface) that are electrically connected to the LCD controller 32, and a backlight pin BL electrically connected to the LCD 33. The microcontroller 1 is configured to transmit a backlight control signal (e.g., a pulse width modulation signal) to the LCD 33 through the backlight pin BL to turn on or turn off a backlight modulo (BLM) of the LCD 33, and to transmit a set of data signals to the LCD controller 32 through the data transmission pins to control display or the LCD 33.

To be specific, in this embodiment, the microcontroller 1 controls the LCD 33 to display words "Sun", "Mon", "Tue", "Wed", "Thu", "Fri", "Sat" and "WSEL" (referring to "week selection") instead of controlling the zeroth to seventh LEDs to emit light as introduced for the first embodiment.

In this embodiment, when the microcontroller 1 determines that none of the numeric keys S0-S9 and the functional key SS has been pressed for the predetermined displaying time period during which time the microcontroller 1 controls the display unit 3 to display the clock time and the clock date with the backlight module being turned on, the microcontroller 1 turns off the backlight module until an arbitrary one of the functional key SS and the numeric keys S0-S9 is pressed, and, upon determining that one of the functional key SS and the numeric keys S0-S9 is pressed when the backlight module is turned off, the microcontroller 1 turns on the backlight module.

In this embodiment, the microcontroller 1 may be further configured to, upon determining that, the short-press operation is performed on one of the numeric keys S0-S9 that corresponds to one of the alarm settings when the backlight module is turned on, control the LCD 33 to display the alarm time and the alarm day(s) that were set for the corresponding alarm setting. Upon determining that the functional key SS is pressed when the backlight module is turned on, the microcontroller 1 may control the LCD 33 to display the next alarm moment.

In summary, the embodiments of the alarm clock according to this disclosure does not require manual operation to enable the alarm setting every weekday, and does not require manual operation to disable the alarm setting on weekends. The embodiments of the alarm clock can support at most ten alarm settings, some of which can be set to be enabled on fixed one or more days of every week. When the user is on leave or on holiday, he or she can manually set a starting date for an alarm setting such that the alarm setting will not be enabled during the vacation and will be automatically enabled after the vacation. Further, the alarm settings may include one or more date settings to set a one-time alarm for a specific date. The user can also press the functional key SS to show the next alarm moment to confirm whether the next alarm is correctly set as desired. In addition, the embodiments of the alarm clock have ten numeric keys S0-S9 that facilitate the user to rapidly input the desired alarm time and to easily stop output of the alarm signal when the audio output unit is outputting the alarm signal.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof, for the purpose of streamlining the disclosure and aiding in the understanding of various inventive aspects, end that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An alarm clock storing at least one alarm setting, comprising:
 a display unit, an audio output unit, ten numeric keys that respectively correspond to ten different integers, a functional key, and a microcontroller that is electrically connected to said display unit, said audio output unit, said numeric keys and said functional key;
 wherein the at least one alarm setting includes at least one weekly alarm setting, and each of the at least one alarm setting corresponds to one of said numeric keys;
 wherein said microcontroller is configured to measure a clock date and a clock time, and to, upon determining that a long-press operation is performed on one of said numeric keys that corresponds to one of the at least one weekly alarm setting, perform a weekly alarm setting procedure with respect to said one of the at least one weekly alarm setting, the weekly alarm setting procedure including a time-setting stage and a day-setting stage;
 wherein said microcontroller is configured to, in the time-setting stage, set an alarm time for said one of the at least one weekly alarm setting based on some of the numeric keys that are pressed in the time-setting stage;
 wherein seven in said ten numeric keys respectively correspond to the seven days of the week in the day-setting stage, and said microcontroller is configured to, when one of said seven in said ten numeric keys is pressed and then said functional key is pressed in the day-setting stage, set, for said one of the at least one weekly alarm setting, a day of the week that corresponds to said one of said seven in said ten numeric keys to be an alarm day on which said microcontroller controls said audio output unit to output an alarm signal at the alarm time; and
 wherein said microcontroller is configured to display the alarm time and the alarm day on said display unit.

2. The alarm clock of claim 1, wherein said ten numeric keys include a number-zero key, a number-one key, a number-two key, a number-three key, a number-four key, a number-five key, a number-six key, a number-seven key, a number-eight key and a number-nine key that respectively correspond to integers from zero to nine;
 wherein said microcontroller includes a pin RA0, a pin RA1, a pin RA2, a pin RA3, a pin RA4, a pin RA5 and a pin RA6; and
 wherein said ten numeric keys are electrically connected to said pin RA6, said pin RA1, said pin RA2, said pin RA3, said pin RA4, said pin RA5 and said pin RA6.

3. The alarm clock of claim 2, wherein the at least one weekly alarm setting includes five weekly alarm settings, and said ten numeric keys are divided into five alarm-setting key pairs, each corresponding to a respective one of the weekly alarm settings and including two of said ten numeric keys that respectively serve as a first alarm-setting key and a second alarm-setting key;
 wherein said microcontroller is configured to, upon determining that the long-press operation is performed on ore of said numeric keys that serves as the first alarm-setting key in one of the alarm-setting key pairs, enter the day-setting stage for the corresponding one of the weekly alarm settings;
 wherein said microcontroller is configured to, upon determining that the long-press operation is performed on one of said numeric keys that serves as the second alarm-setting key in one of the alarm-setting key pairs, enter the time-setting stage for the corresponding one of the weekly alarm settings; and
 wherein said microcontroller is configured to, upon determining that said functional key and one of said numeric keys ere both pressed, perform a starting date setting procedure with respect to one of the weekly alarm settings that corresponds to one of the alarm-netting key pairs including said one of said numeric keys; and
 wherein said microcontroller is configured to, in the starting date setting procedure for said one of the weekly alarm settings, set a starting date from which the weekly alarm setting is enabled based on some of the numeric keys that are pressed in the starting date setting procedure.

4. The alarm clock of claim 3, wherein the five alarm-setting key pairs include a first alarm-setting key pair of said number-zero key and said number-one key, a second alarm-setting key pair of said number-two key and said number-three key, a third alarm-setting key pair of said number-four key and said number-five key, a fourth alarm-setting key pair of said number-six key and said number-seven key, and a fifth alarm-setting key pair of said number-eight key and said number-nine key;

wherein said number-zero key and said number-one key respectively serve as the first alarm-setting key and the second alarm-setting key of the first alarm-setting key pair, said number-two key and said number-three key respectively serve as the first alarm-setting key and the second alarm-setting key of the second alarm-setting key pair, said number-four key and said number-five key respectively serve as the first alarm-setting key and the second alarm-setting key of the third alarm-setting key pair, said number-six key and said number-seven key respectively serve as the first alarm-setting key and the second alarm-setting key of the fourth alarm-setting key pair, and said number-eight key and said number-nine key respectively serve as the first alarm-setting key and the second alarm-setting key of the fifth alarm-setting key pair;

wherein the five weekly alarm settings include a weekly alarm setting A01, a weekly alarm setting B01, a weekly alarm setting C01, a weekly alarm setting D01 and a weekly alarm setting E01 that respectively correspond to the first to fifth alarm-setting key pairs; and wherein said seven in said ten numeric keys that respectively correspond to the seven days of the week in the day-setting stage are one of a combination of said number-zero key, said number-one key, said number-two key, said number-three key, said number-four key, said number-five key and said number-six key, and a combination of said number-one key, said number-two key, said number-three key, said number-four key, said number-five key, said number-six key and said number-seven key.

5. The alarm clock of claim 2, wherein the at least one weakly alarm setting includes nine weekly alarm settings that respectively correspond to nine in said ten numeric keys;

wherein said microcontroller is configured to, upon determining that the long-press operation is performed on one of said numeric keys that corresponds to one of the weekly alarm settings, perform the weekly alarm setting procedure with respect to said one of the weekly alarm settings by:
entering the day-setting stage; and
after said functional key is pressed in the day-setting stage, entering the time-setting stage;

wherein said microcontroller is configured to, when said functional key and one of said nine in said ten numeric keys are both pressed, perform a starting date setting procedure with respect to one of the weekly alarm settings that corresponds to said one of said nine in said ten numeric keys;

wherein said microcontroller is configured to, in the starting dace setting procedure for said one of the weekly alarm settings, set a starting date from which the weekly alarm setting is enabled based on some of the numeric keys that are pressed in the starting date setting procedure.

6. The alarm clock of claim 5, wherein the nine weekly alarm settings include a weekly alarm settling A02, a weekly alarm setting B02, a weekly alarm setting C02, a weekly alarm setting D02, a weekly alarm setting E02, a weekly alarm setting F02, a weekly alarm setting G02, a weekly alarm setting H02 and a weekly alarm setting I02 that respectively correspond to said number-zero key, said number-one key, said number-two key, said number-three key, said number-four key, said number-five key, said number-six key, said number-seven key and said number-eight key; and wherein said seven in said ten numeric keys that respectively correspond to the seven days of the week in the day-setting stage are one of a combination of said number-zero key, said number-one key, said number-two key, said number-three key, said number-four key, said number-five key and said number-six key, and a combination of said number-one key, said number-two key, said number-three key, said number-four key, said number-five key, said number-six key and said number-seven key.

7. The alarm clock of claim 2, wherein said display unit includes a seven-segment assembly, a zeroth light-emitting diode (LED), a first LED, a second LED, a third LED, a fourth LED, a fifth LED and a sixth LED;

therein said microcontroller includes a pin RB0, a pin RB1, a pin RB2, a pin RB3, a pin RB4, a pin RB5, a pin RB6, a pin RB7, a pin RC3, a pin RC4, a pin RC5, a pin RC6 and a pin RC7;

wherein said seven-segment assembly includes:
four seven-segment displays each including seven light-emitting segments;
a colon display;
a pin H1, a pin H2, a pin H3 and a pin H4 that are electrically and respectively connected to said seven-segment displays, and that are electrically and respectively connected to said pin RC4, said pin RC5, said pin RC6 and said pin RC7 of said microcontroller for said microcontroller to control each of said seven-segment displays to display or not to display through the corresponding one of said pin H1, said pin H2, said pin H3 and said pin H4;
a pin a, a pin b, a pin c, a pin d, a pin e, a pin f and a pin g that are electrically and respectively connected to said seven light-emitting segments of each of said seven-segment displays, and that are electrically and respectively connected to said pin RB6, said pin RB5, said pin RB4, said pin RB3, said pin RB2, a said pin RB1, and said pin RB0 of said microcontroller; and
a pin dp that is electrically connected to said colon display and said pins RB7 of said microcontroller;

wherein said zeroth to sixth LEDs are respectively configured for indicating Sunday, Monday, Tuesday, Wednesday, Thursday, Friday and Saturday, and each of said zeroth to sixth LEDs includes an anode and a cathode;

wherein said cathodes and said anodes of said zeroth to sixth LEDs are connected in one of a first LED connection scenario and a second LED connection scenario;

wherein, in the first LLP connection scenario, all of said cathodes of said zeroth to sixth LEDs are electrically connected to said pin RC3 of said microcontroller, and said anode of each of said zeroth to sixth LEDs is electrically connected to a unique one of said pin RB0, said pin RB1, said pin RB2, said pin RB3, said pin RB4, said pin RB5 and said pin RB6 of said microcontroller;

wherein, in the second LED connection scenario, all of said anodes of said zeroth to sixth LEDs are electrically connected to said pin RC3 of said microcontroller, and said cathodes of each of said zeroth to sixth LEDs is electrically connected to a unique one of said pin RB0, said pin RB1, said pin RB2, said pin RB3, said pin RB4, said pin RB5 and said pin RB6 of said microcontroller;

wherein said microcontroller is configured to, upon determining that none of said numeric keys and said functional key has been pressed for a predetermined time period, control said seven-segment assembly to not display until an arbitrary one of said functional key and said numeric keys is pressed;

wherein said microcontroller is configured to, upon determining that one of said functional key and said numeric keys is pressed when said seven-segment assembly is not displaying, control said seven-segment assembly to display one of the clock date and the clock time;

wherein said microcontroller is configured to, upon determining that a short-press operation is performed on one of said numeric keys that corresponds to one of the at least one weekly alarm setting when said seven-segment assembly is displaying one of the clock date and the clock time, control said seven-segment assembly to display the alarm time that was set for said one of the at least one weekly alarm setting and control said zeroth to sixth LEDs to display the alarm day that was set for said one of the at least one weekly alarm setting; and wherein said microcontroller is configured to, upon determining that said functional key is pressed when said seven-segment assembly is displaying one of the clock date and the clock time, control said display unit to display a next alarm moment that refers to the alarm time and the alarm day that were set for one of the at least one weekly alarm setting and that are next to the clock time and the clock date among all of the at least one weekly alarm setting.

8. The alarm clock of claim 7, wherein said display unit further includes a seventh LED that includes an anode and a cathode;

wherein, is the first LED connection scenario, said anode and said cathode of said seventh LED are electrically and respectively connected to said pin RB7 and said pin RC3 of said microcontroller; and wherein, in the second LED connection scenario, said anode and said cathode of said seventh LED are electrically and respectively connected to said pin RC3 and said pin RB7 of said microcontroller; and wherein said microcontroller is configured to, when controlling said zeroth to sixth LEDs to display the alarm day that was set for said one of the at least one weekly alarm setting, control said seventh LED to emit light to indicate that a current display of said display unit is related to the at least one weekly alarm setting.

9. The alarm clock of claim 2, wherein said display unit includes a liquid crystal display (LCD) and an LCD controller, and said LCD includes a backlight module;

wherein said microcontroller further includes a set of data transmission pins and a backlight pin, and is configured to transmit a backlight control signal to said LCD through said backlight pin to turn on or turn off said backlight module, and to transmit a set of data signals to said LCD controller through said data transmission pins to control display of said LCD;

wherein said microcontroller is configured to, upon determining that none of said numeric keys and said functional key has been pressed for a predetermined time period, turn off said backlight module until an arbitrary one of said functional key and said numeric keys is pressed;

wherein said microcontroller is configured to, upon determining that one of said functional key and said numeric keys is pressed when said backlight module is turned off, turn on said backlight module;

wherein said microcontroller is configured to, upon determining that a short-press operation is performed on one of said numeric keys that corresponds to one of the at least one weekly alarm setting when said backlight module is turned on, control said LCD to display the alarm time and the alarm day that were set for said one of the at least one weekly alarm setting; and wherein said microcontroller is configured to, upon determining that said functional key is pressed when said backlight module is turned on, control said LCD to display a next alarm moment, which refers to the alarm time and the alarm day that were set for one of the at least one weekly alarm setting and that are next to the clock time and the clock date among all of the at least one weekly alarm setting.

10. The alarm clock of claim 2, wherein each of said number-zero to number-nine keys and said functional key has a first terminal, a second terminal end a press terminal;

wherein each of said numeric keys and said functional key is electrically connected to a unique combination of two of said pin RA0, said pin RA1, said pin RA2, said pin RA3, said pin RA4, said pin RA5 and said pin RA6, and is configured to make electrical connection between said first and second terminals thereof when said press terminal thereof is being pressed; and wherein said first terminal and said second terminal of each of said numeric keys and said functional key are respectively connected to said two of said pin RA0, said pin RA1, said pin RA2, said pin RA3, said pin RA4, said pin RA5 and said pin RA6 in the unique combination.

11. The alarm clock of claim 2, therein said microcontroller is configured to, upon determining that a setting entry condition is satisfied, enter a clock setting stage where said microcontroller sets the clock date and the clock time based on some of said numeric keys that are pressed in the clock setting stage, and display the clock date and the clock time on said display unit.

12. The alarm clock of claim 11, wherein the setting entry condition is that predetermined two of said numeric keys are both pressed.

13. The alarm clock of claim 11, further comprising a clock setting key, wherein the setting entry condition is that said clock setting key is pressed.

14. The alarm clock of claim 1, wherein said microcontroller further includes a pin RC2, and said alarm clock further comprises a switch that includes a first terminal electrically connected to a voltage source, a second terminal electrically connected to ground, and a third terminal electrically connected to said pin RC2 of said microcontroller;

wherein said switch is operable to electrically connect said third terminal to one of said first terminal and said second terminal;

wherein said switch is defined to be in an ON state when said third terminal is electrically connected to a specific one of said first and second terminals, and is defined to be in an OFF state when said third terminal is electrically connected to the other one of said first and second terminals;

wherein said microcontroller is configured to, when said switch is in the OFF state, disable all of the alarm settings, and, when said switch is in the OFF state and said display unit is displaying one of the clock date and the clock time, control said display unit to display a message indicating that none of the at least one alarm setting is enabled upon determining that said functional key is pressed; and wherein said microcontroller is configured to, when said switch is switched from the OFF state to the ON state, control said display unit to display a next alarm moment that refers to the alarm time and the alarm day that were set for one of the at least one weekly alarm setting and that are next to the clock time and the clock date among all of the at least one weekly alarm setting.

15. The alarm clock of claim 1, wherein said microcontroller is configured to, upon determining that said functional key and one of said numeric keys, are both pressed, perform, a starting date setting procedure for one of the at least one weekly alarm setting that corresponds to said one of said numeric keys;

wherein said microcontroller is configured to, in the starting date setting procedure for said one of the at least one weekly alarm setting, set a starting date from which the weekly alarm setting is to be enabled based on some of the numeric keys that are pressed in the starting date setting procedure.

16. The alarm clock of claim 1, wherein each of the at least one weekly alarm setting has a starting date, and said microcontroller is configured to, upon determining that the clock date is equal to or later than the starting date set for one of the at least one weekly alarm setting and that the clock time is equal to the alarm time set for said one of the at least one weekly alarm setting, control said audio output unit to output the alarm signal;

wherein said microcontroller is configured to, upon determining that one of said numeric keys is pressed when said audio output unit is outputting the alarm signal, control said audio output unit to stop outputting the alarm signal; and wherein said microcontroller is configured to, upon determining that said functional key is pressed when said audio output unit is outputting the alarm signal, control said audio output unit to temporarily stop outputting the alarm signal for a predetermined snooze time period, and then resume to output the alarm signal.

* * * * *